United States Patent
Henning et al.

(10) Patent No.: US 8,862,794 B2
(45) Date of Patent: Oct. 14, 2014

(54) NON-DISRUPTIVE SELECTIVE TRAFFIC BLOCKING IN A SAS DOMAIN

(75) Inventors: Brett J. Henning, Colorado Springs, CO (US); Harold L. Johnson, Wichita, KS (US); William K. Petty, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 171 days.

(21) Appl. No.: 13/590,306

(22) Filed: Aug. 21, 2012

(65) Prior Publication Data

US 2014/0059256 A1    Feb. 27, 2014

(51) Int. Cl.
G06F 3/00    (2006.01)
G06F 3/06    (2006.01)
G06F 13/40   (2006.01)
G06F 13/38   (2006.01)

(52) U.S. Cl.
CPC ............. *G06F 13/38* (2013.01); *G06F 3/0632* (2013.01); *G06F 13/4022* (2013.01); *G06F 13/385* (2013.01); *G06F 3/0637* (2013.01)
USPC .......................................................... 710/36

(58) Field of Classification Search
CPC . G06F 13/4022; G06F 13/385; G06F 3/0632; G06F 3/0637
See application file for complete search history.

(56) References Cited

U.S. PATENT DOCUMENTS

| | | | |
|---|---|---|---|
| 6,944,686 B2 * | 9/2005 | Naruse et al. | 710/39 |
| 7,673,167 B2 * | 3/2010 | Elliott et al. | 714/3 |
| 7,739,416 B2 * | 6/2010 | Chikusa et al. | 710/2 |
| 7,805,554 B2 * | 9/2010 | Uddenberg et al. | 710/74 |
| 7,958,273 B2 * | 6/2011 | El-Batal | 710/2 |
| 2002/0040414 A1 * | 4/2002 | Uehara et al. | 710/100 |
| 2005/0010831 A1 * | 1/2005 | Bashford et al. | 713/323 |
| 2007/0028062 A1 * | 2/2007 | Radhakrishnan et al. | 711/158 |
| 2007/0220204 A1 * | 9/2007 | Nakajima et al. | 711/114 |
| 2007/0226419 A1 * | 9/2007 | Roy et al. | 711/118 |
| 2007/0226757 A1 * | 9/2007 | Bashford et al. | 719/326 |
| 2011/0145452 A1 * | 6/2011 | Schilling et al. | 710/74 |
| 2012/0311256 A1 * | 12/2012 | Nakajima et al. | 711/114 |
| 2013/0138851 A1 * | 5/2013 | Dominguez et al. | 710/300 |
| 2013/0336105 A1 * | 12/2013 | Myrah et al. | 370/216 |

OTHER PUBLICATIONS

'Serial Attached SCSI' Standard 1.1, T10/1601-D, Mar. 13, 2004.*
Penokie, George, "T10/05-370 revision 2"; T10 Committee (SCSI), Nov. 9, 2005, 11 pages.

* cited by examiner

*Primary Examiner* — Henry Tsai
*Assistant Examiner* — Jing-Yih Shyu
(74) *Attorney, Agent, or Firm* — Suiter Swantz pc llo

(57) ABSTRACT

The invention may be embodied in a SAS expander with register bits within Phys associated with I/O devices. Setting and unsetting the register bit in the Phy associated with a particular physical or logical device allows I/O traffic to be blocked and unblocked, as desired, to the selected physical or logical devices. In a particular embodiment, when the register bit is set to a blocking state, an OPEN request that comes in on the SAS link is rejected using OPEN_REJECT (RETRY). Phy register bits may be provided for multiple different SAS protocols that can be controlled individually for each attached SAS device. The Phy register bit may also be used to reject only SAS connection requests that attempt to leave a particular SAS link.

20 Claims, 4 Drawing Sheets

NON-DISRUPTIVE SELECTIVE TRAFFIC BLOCKING IN A SAS DOMAIN

TECHNICAL FIELD

The present invention relates to serial attached SCSI (SAS) domains and, more particularly, to a SAS expander with configurable register bits to selectively block traffic from physical I/O devices.

BACKGROUND

In a SAS domain, discovery I/O operations must compete with all other I/O operations. A problem can arise when the I/O traffic level is so high that it crowds out the discovery traffic, which can in turn make it difficult for discovery to complete in a timely manner. In some cases, discovery may not complete at all as a result of the congestion. Even in the best case, discovery in large topologies can take more time than is desired. There is, therefore, a continuing need for selectively blocking I/O traffic in a SAS domain. More particularly, there is a need for blocking and unblocking I/O traffic for selected physical or logical devices connected to a common SAS expander or initiator.

SUMMARY

The invention provides a SAS expander with I/O control register bits within Phys associated with physical or logical I/O devices. Setting and unsetting the I/O control register bit for the Phy associated with a particular physical or logical device allows I/O traffic to be blocked and unblocked, as desired, to the selected physical or logical device. For example, a register bit setting of 0 may be used to enable OPEN requests, and a register bit setting of 1 may be used to disable OPEN requests. In a particular embodiment, when the register bit is set to a blocking state, an OPEN request that comes in on the SAS link is rejected using an OPEN_REJECT (RETRY) response.

An extension of the invention uses multiple I/O control register bits for each Phy so that individual protocols may be enabled and disabled independently for selected physical devices. For instance, register bits can be provisioned to reject SSP and STP/SATA requests, but to allow SMP OPEN requests. Each Phy may have its own set of enabled and disabled SAS protocols. In addition, each Phy may be configured the same as, or differently from, the other Phys in the SAS domain, as desired.

A related extension provides the ability to reject only those OPEN requests that attempt to go out of a SAS link. A use case for this capability may be to allow OPEN requests to travel inside of an expander (the defined SAS link for this purpose) but not to leave it. This allows the expander's bus agent to still send requests to the drive, but prevents the drive from interfering with the larger SAS domain for the period of time when the blocking bit is set. This capability may also be extended to SAS connection requests generally such that each Phy may have certain SAS protocols enabled, disabled, and/or disabled only for SAS protocols that attempt to leave a defined SAS link, as desired. Another related extension is to selectively ORR (OPEN_REJECT (RETRY)) a request to open a SAS connection or the use of a particular SAS address received in response to the setting of associated bits.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

Figure 1:
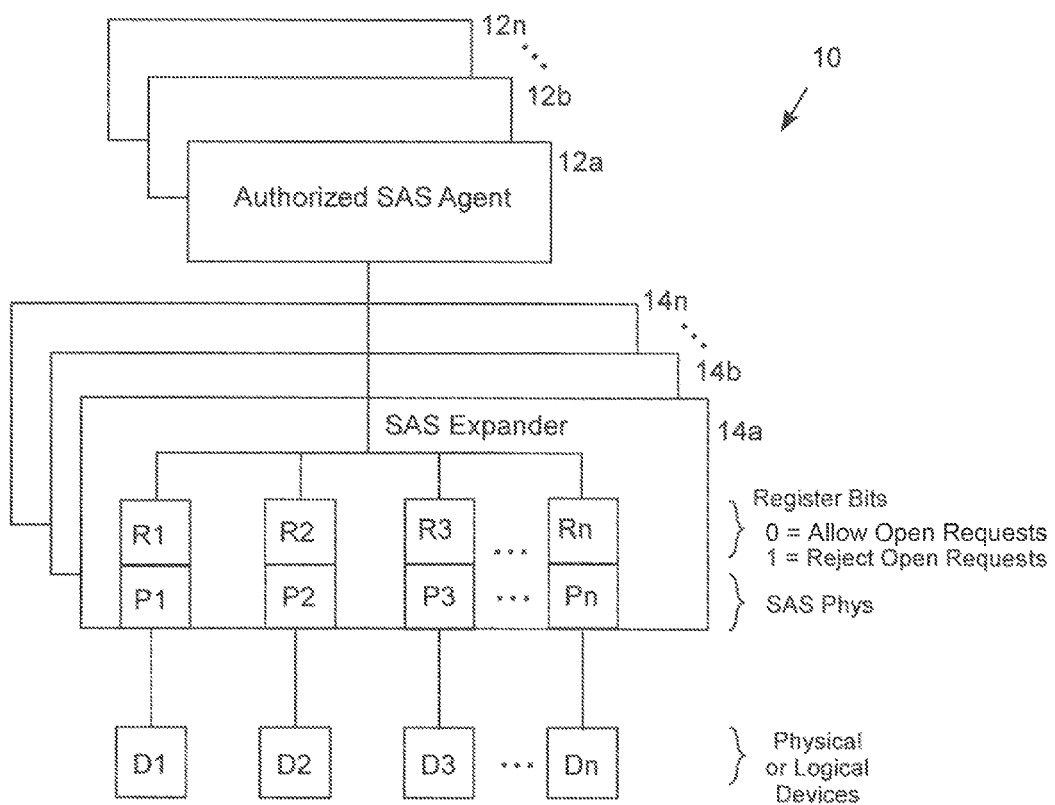
FIG. 1 is a functional block diagram of a host computer and SAS expander using register bits to control I/O traffic from selected physical devices.

The invention may be embodied in a SAS expander with register bits for Phys associated with physical or logical I/O devices. While the disclosure positions the I/O control register bits at the Phy level, it will be understood that the I/O control register bits could be located in any SAS I/O mediation device and at any desired level in the SAS domain. Nevertheless, locating the I/O control register bits at the Phy level within the SAS expander is advantageous and will be described as an illustrative, but not the exclusive, embodiment of the invention.

The invention may be, but is not limited to, providing a mechanism within a SAS expander to selectively enable and disable incoming or outgoing OPEN requests for a selected physical or logical device. In a particular embodiment, the invention may be part of the SAS expander link in which setting and unsetting a register bit in the Phy associated with a particular physical or logical device allows I/O traffic to be blocked and unblocked, as desired, to the selected device. By way of example, I/O traffic may be selectively blocked and unblocked to any physical device, logical device, another SAS expander, or any other desired SAS target served by the SAS expander. For example, a register bit setting of 0 may allow OPEN requests, and a register bit setting of 1 may reject OPEN requests. When enabled for this example, an OPEN request that comes in on the SAS link is rejected using OPEN_REJECT (RETRY).

SAS agents, including initiators, expanders and targets contain SAS Phys, which provide the low-level communication interface between these devices. The SAS Phy is a combination of the physical or logical device layer, phy layer and link layer functions. A minimum of two Phys (one at each end point) is typically required to complete a SAS physical or logical connection pathway. The placement of the I/O "OPEN reject" register bit at the SAS Phy level is advantageous to the operation of the system in order to prevent rejected OPEN requests from entering the connection manager's hardware state machine. This characteristic allows OPEN requests to be rejected for a selected physical device while allowing I/O flow to continue on any links where the "OPEN reject" capability is not enabled. As a result, important processes, such as discovery, can continue in SAS links that are not selected for OPEN reject. Further, since I/O traffic can be selectively held out of the domain, the remaining traffic, such as traffic deemed to be high priority, can complete very quickly. It should be understood, however, that placement of the I/O "OPEN reject" register bit at the SAS Phy level is but one example embodiment of the invention, which may also be practiced in alternative embodiments through I/O register bits placed at other locations and in systems that do not include or do not utilize a SAS Phy level for I/O traffic control.

RAID data storage devices are one example of the types of physical devices that may be served by the SAS expander. Other examples include another expander, a SAS initiator, or any other SAS end-device (target). The invention may also be applied to "logical" devices, for example when there is a logical connection inside an expander (or an initiator) to a logical function/phy/port also inside the expander.

In the disclosed embodiment, the invention is compatible with current SAS implementations, including devices made by different vendors complying with established SAS protocols. When I/O operations are blocked, they are delayed but not canceled in that they can be retried. The blocking of traffic is selective, so that some Phys may be blocked and others left open at the discretion of the SAS expander. Blocking I/O traffic from certain devices frees the remaining SAS Phys to complete discovery quickly, which allows for the domain to operate in a smoother fashion.

It should also be appreciated that each Phy can be configured to allow its I/O control register bit to be controlled by any authorized SAS agent(s), such as the initiator, the host, the expander, firmware running on the expander or initiator, and so forth. That is, each Phy may authorize its I/O control register bit to be operated by any number of authorized SAS agents. As one example, control over the I/O control register bit is provided by the SAS expander itself, which is the usual configuration. However, this is merely one illustrative embodiment of the invention, and it will be understood that each Phy may authorize control over its I/O control register bit by any desired SAS agents(s). In addition, multiple agents may be authorized to operate the control bits for any particular Phy, and different agent(s) may be authorized to operate the I/O control register bits in different Phys. Control over the I/O control register bit may be implemented in software, firmware, or hardware in an automated embodiment.

Referring now to the figures, FIG. 1 is a functional block diagram of a SAS I/O control system 10 including a plurality of SAS agents 12a-n, which may each be a host computer, a SAS initiator, or any other agent or device participating in the SAS topology. Each SAS agent may be connected to one or more SAS expanders 14a-n, each connecting a number of physical or logical devices D1-Dn (SAS targets) to the SAS agent. While a single SAS agent 12 and a single SAS expander 14 will be described for descriptive convenience, it will be understood that multiple SAS agents and multiple SAS expanders may implement the features described for the illustrative expander. In addition, while the I/O control register bits are located at the Phy level in this embodiment, it will be understood that the I/O control register bits may be located elsewhere if desired.

Generally described, the SAS expander 14 includes a number of Phys P1-Pn with each Phy dedicated to an associated virtual device physical device; P1 corresponds to D1, P2 corresponds to D2, and so forth. Each Phy has been provisioned with a register bit R1-Rn (I/O control register bits) corresponding to the associated Phy; R1 corresponds to P1; R2 corresponds to P2, and so forth.

An authorized SAS agent, such as the SAS expander itself, has the ability to set and unset each I/O register control bit individually to enable or disable SAS Open requests for each associated physical or logical device individually. For example, setting the I/O control register bit R1 to "0" enables Open requests for the associated physical or logical device D1, and setting the I/O control register bit R1 to "1" disables Open requests for the associated physical or logical device D1. Similarly, setting the I/O control register bit R2 to "0" enables Open requests for the associated physical or logical device D2, and setting the I/O control register bit R2 to "1" disables Open requests for the associated physical or logical device D2, and so forth. When the I/O control register bit R1 is set to "1" [disable] in this particular embodiment, the Phy P1 for the associated physical or logical device D1 returns an OPEN_REJECT (RETRY) response to any OPEN request for the physical or logical device D1. The OPEN_REJECT (RETRY) refuses but does not cancel the OPEN request, so it may be retried at later times until the I/O control register bit R1 is again set to "0" [enable] and the OPEN request is fulfilled. The other register bits operate similarly for their associated physical or logical devices.

Figure 2:
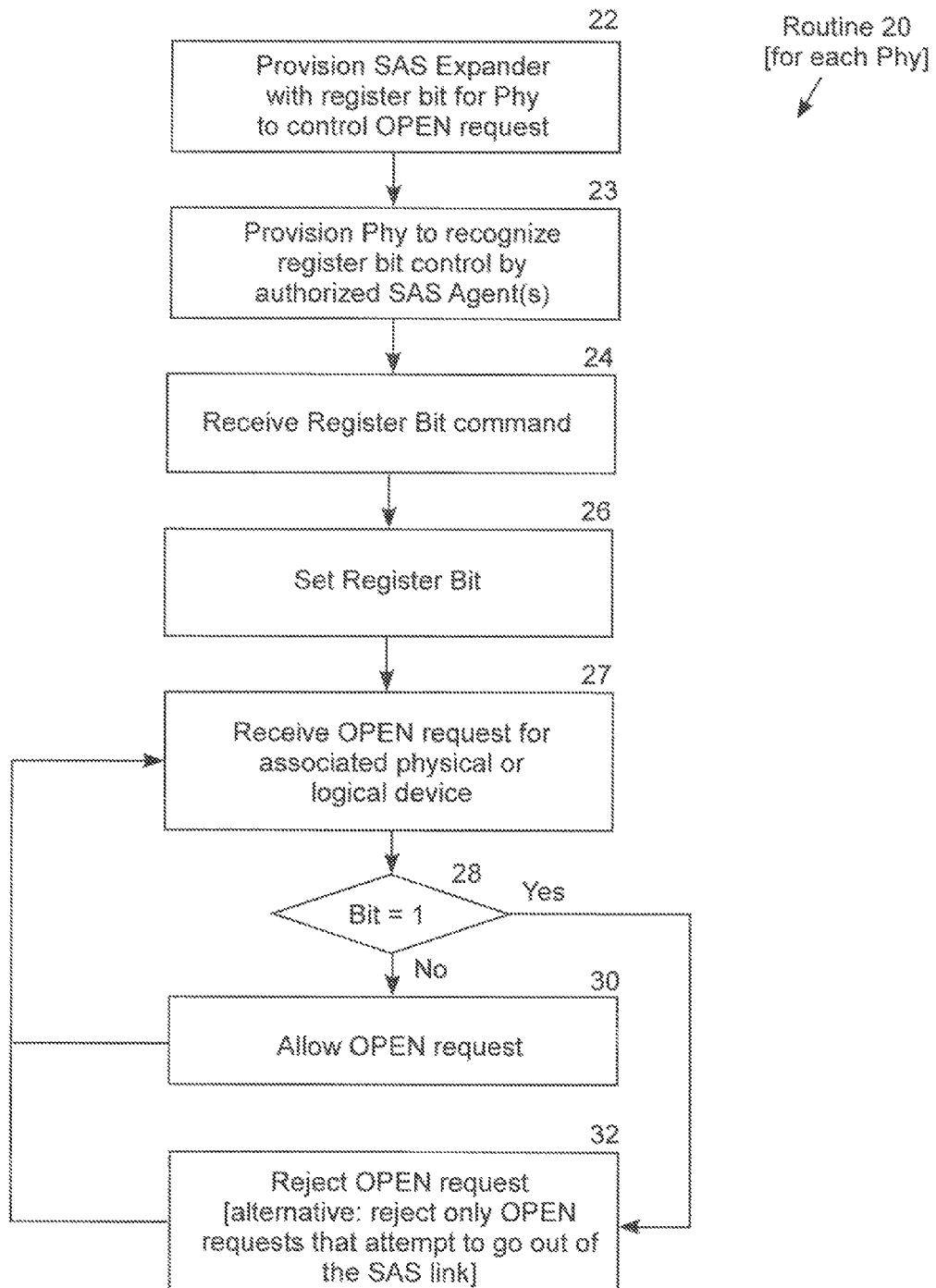
FIG. 2 is a functional block diagram of a method for using register bits to control I/O traffic from selected physical devices.

FIG. 2 is a functional block diagram of Routine 20 illustrating a method for using register bits to control I/O traffic for selected physical or logical devices in a SAS domain. The method illustrated in FIG. 2 corresponds to the block diagram of FIG. 1. Routine 20 may be performed by each SAS expander in the SAS domain for which I/O control is desired. It will therefore be understood that each authorized SAS agent can operate the I/O control register bits for each physical or logical device individually. The methodology for the operation of the illustrative SAS expander may be used to provide I/O control over any number of SAS expanders and associated physical or logical devices In step 22, the SAS expander is provisioned with a register bit for the Phy to control OPEN requests. Step 22 is followed by step 23, in which the SAS expander is configured to authorize control over its I/O control register bits by one or more desired SAS agents, in this example the SAS expander itself. Step 23 is followed by step 24, in which the Phy receives an I/O control register bit command from an authorized SAS agent. Step 24 is followed by step 26, in which the Phy sets the I/O control register bit as directed by the authorized SAS agent. Step 26 is followed by step 27, in which the Phy receives an OPEN request for its associated physical or logical device. Step 27 is followed by step 28, in which the SAS expander determines whether the I/O control register bit is set to 1 [disable Open requests]. If the I/O control register bit is not set to 1 [i.e., set to 0=enable Open requests], the "NO" branch is followed to step 30, in which the SAS expander allows the OPEN request.

If the I/O control register bit is set to 1 [disable Open requests], the "YES" branch is followed to step 32, in which the SAS expander rejects the OPEN request, typically by returning an OPEN_REJECT (RETRY) response to the SAS initiator of the request. As an alternative, step 32 may be configured to reject only OPEN requests that attempt to go out of a particular SAS link. For example, this alternative may be used to allow OPEN requests to travel inside of an expander, but not to leave it. Steps 30 and 32 return the step 26, in which the register bit settings may be changed for subsequent OPEN requests.

Figure 3:
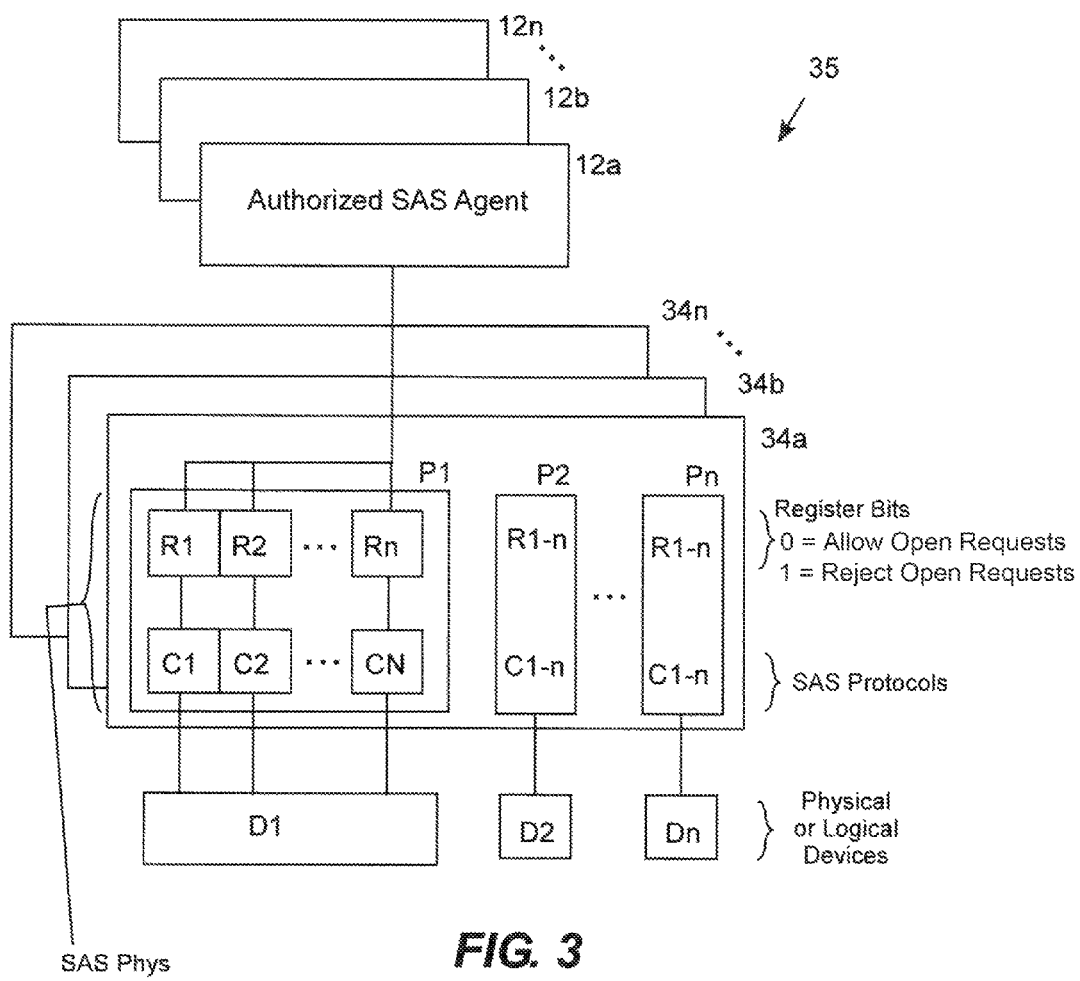
FIG. 3 is a functional block diagram of a host computer and SAS expander using register bits to control I/O traffic for specific SAS Requests received from selected physical devices.

FIG. 3 is a functional block diagram of an alternative SAS I/O control system 35 including SAS agents 12a-n and modified SAS expanders 34a-n connecting a number of physical or logical devices D1-Dn. Again, one SAS agent and one SAS expander will be included in the following description while the methodology described may be applied to any number of participating SAS agents and SAS expanders. In this alternative, each Phy P1-Pn has a plurality of I/O control register bits R1-Rn, where each register bit corresponds to a different SAS protocol C1-Cn. In other words, the SAS I/O control system 10 shown in FIG. 1 allows an authorized SAS agent, such as the SAS expander itself, to control one particular SAS connection request (the Open request), whereas the alternative SAS I/O control system 35 shown in FIG. 3 allows the authorized SAS agent to control many different SAS connection requests based on protocol for each Phy individually. In addition, each Phy need not have I/O control register bits provisioned for the same SAS protocol and control will ordinarily be provided for only certain SAS protocols as a matter of design choice. For instance, register bits can be provisioned for SSP and STP/SATA requests, but not for other SAS protocols. That is, each SAS protocol for each Phy may be provisioned and controlled individually.

Figure 4:
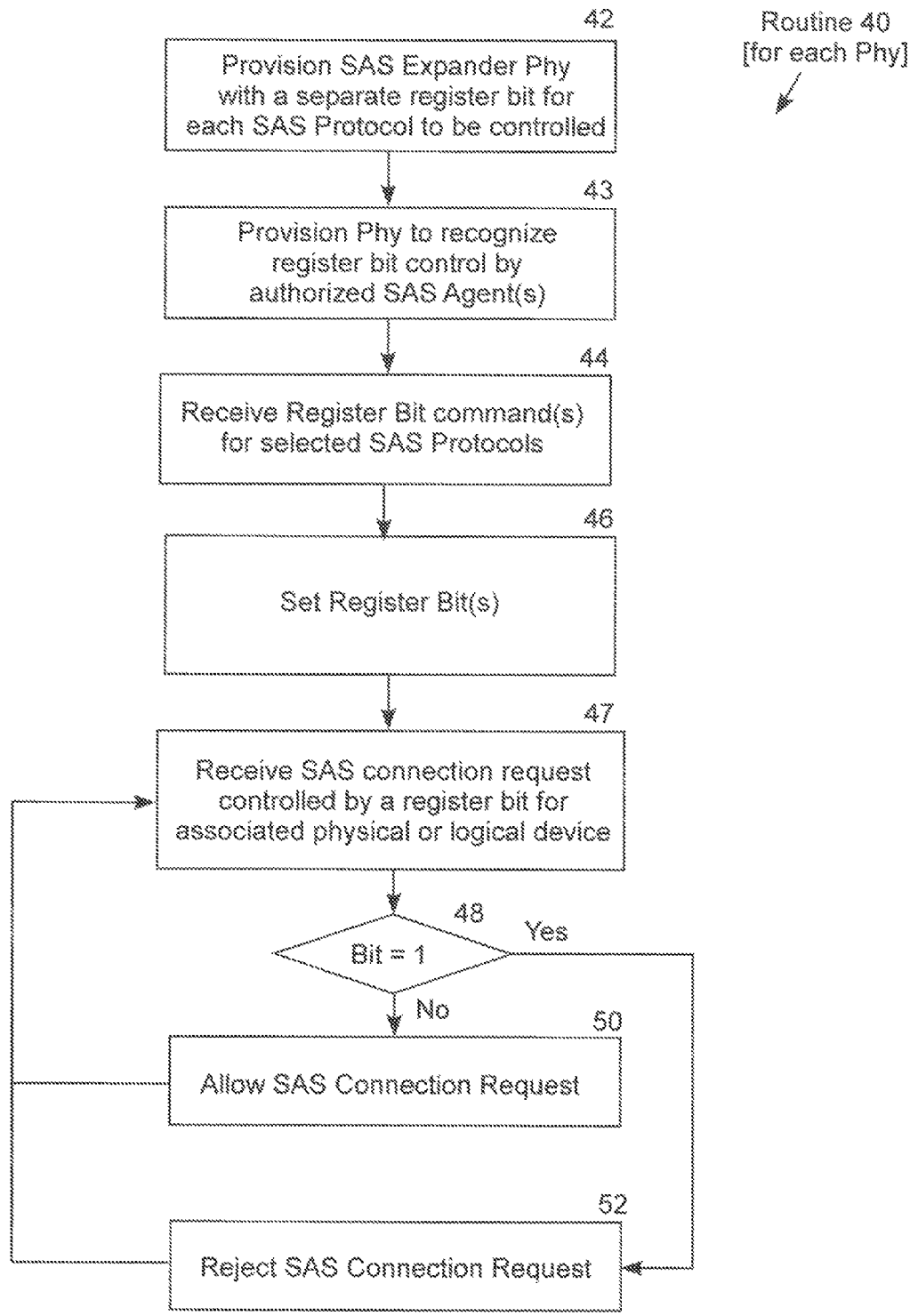
FIG. 4 is a functional block diagram of a method for using register bits to control I/O traffic for specific SAS Requests received from selected physical devices.

FIG. 4 is a functional block diagram of Routine 40, which illustrates a method for using register bits to control I/O traffic for specific SAS connection requests received from selected physical devices. The method illustrated in FIG. 4 corresponds to the block diagram of FIG. 3. As with Routine 20, Routine 40 is performed for each Phy in the SAS domain for which I/O control is desired, and I/O control may further be specified for specific SAS protocols within each Phy.

In step 42, the SAS expander is provisioned with a separate register bit for each SAS protocol to be controlled. Step 42 is followed by step 43, in which the Phy is configured to authorize control over its I/O control register bits by one or more desired SAS agents, in this example the SAS expander itself. Step 43 is followed by step 44, in which the Phy receives an I/O control register bit command from an authorized SAS agent, which in this example may apply to an individual SAS protocol. Step 44 is followed by step 46, in which the Phy sets the I/O control register bit for the selected SAS protocols as directed by the host computer. Step 46 is followed by step 47, in which the Phy receives a SAS connection request for its associated physical or logical device. Step 47 is followed by step 48, in which the SAS expander determines whether the I/O control register bit is set to 1 [disable SAS connection request] for the received SAS connection request (note that "1" is merely an example of a binary selection, such as "true" or "false". If the I/O control register bit is not set to 1 [i.e., set to 0=enable SAS connection request], the "NO" branch is followed to step 50, in which the SAS expander allows the SAS connection request. If the I/O control register bit is set to 1 [disable SAS connection request], the "YES" branch is followed to step 52, in which the Phy rejects the SAS connection request. As an alternative, step 52 may be configured to reject only SAS connection requests that attempt to go out of a particular SAS link. For example, this alternative may be used to allow SAS connection requests to travel inside of an expander, but not to leave it. Steps 50 and 52 return the step 46, in which the register bit settings may be changed for subsequent SAS connection requests.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being capable of being "coupled" to each other to achieve the desired functionality. Specific examples of objects capable of being coupled to each other include but are not limited to physically mated and/or physically interacting components and/or wirelessly interacting and/or wirelessly interacting components and/or logically interacting and/or logically interacting components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. A serial attached small computer system interface (SAS) input/output (I/O) control system comprising:
    one or more SAS agents;
    a plurality of physical or logical devices;
    one or more SAS expanders connecting the physical devices to the one or more SAS agents and mediating I/O communications between the plurality of physical or logical devices and the one or more SAS agent;
    each SAS expander including a plurality of Phys, wherein each Phy is associated with a particular physical device;
    each SAS expander comprising a plurality of configurable I/O control register bits, wherein each configurable I/O control register bit is associated with a particular physical or logical device of the plurality of physical or logical devices, wherein each configurable I/O control register bit is controllable by one or more particular SAS agents of the one or more SAS agents;
    wherein each SAS expander is further configured to enable SAS OPEN requests for the particular logical or physical device when the associated configurable I/O control register bit is set to a first value, and each SAS expander is further configured to disable SAS OPEN requests that are configured to leave a SAS link when the associated configurable I/O control register bit is set to a second value;
    wherein each SAS expander is further configured to operate the plurality of configurable I/O control register bits; and
    wherein each Phy is configured to return an OPEN REJECT (RETRY) response to a disabled OPEN request to delay and not cancel the disabled OPEN request when the associated particular configurable I/O control register bit is set to the second value.

2. The SAS I/O control system of claim 1, wherein multiple SAS agents are configured to operate a particular configurable I/O control register bit of the plurality of configurable I/O control register bits.

3. The SAS I/O control system of claim 1, wherein the physical devices comprise redundant array of independent disks (RAID) data storage devices.

4. The SAS I/O control system of claim 1, wherein the SAS expander is configured to allow discovery I/O operations to be completed more quickly by setting at least one of the plurality of configurable I/O control register bits to the second value.

5. The SAS I/O control system of claim 1, wherein, for a particular Phy, the SAS expander is configured to set a first particular configurable I/O control register bit associated with a first SAS protocol to the first value and configured to set a second particular configurable I/O control register bit associated with a second SAS protocol to the second value.

6. The SAS I/O control system of claim 1, wherein the physical devices comprise data storage devices.

7. The SAS I/O control system of claim 1, wherein each Phy has a set of enabled and disabled SAS protocols.

8. A serial attached small computer system interface (SAS) input/output (I/O) control system comprising:
    a SAS agent;
    a plurality of physical or logical devices;
    a SAS expander connecting the physical devices to the SAS agent and mediating I/O communications between the plurality of physical or logical devices and the SAS agent;
    wherein the SAS expander comprises a plurality of SAS Phys, wherein the SAS expander includes a plurality of configurable I/O control register bits, wherein each SAS Phy is associated with a particular physical or logical device, wherein each SAS Phy is associated with a particular configurable I/O control register bit, and wherein the SAS agent is authorized to operate each configurable I/O control register bit;
    wherein each SAS Phy is configured to enable opening of a SAS connection or use of a SAS address when the particular configurable I/O control register bit is set to a first value, and wherein each SAS Phy is further configured to reject opening of the SAS connection and use of the SAS address when the particular configurable I/O control register bit is set to a second value;
    wherein the SAS expander is further configured to operate each configurable I/O control register bit; and
    wherein each SAS Phy is configured to return an OPEN REJECT (Retry) in response to a SAS connection request for a disabled protocol to delay and not cancel the SAS connection request for the disabled protocol when the particular configurable I/O control register bit is set to the second value.

9. The SAS I/O control system of claim 8, wherein additional SAS agents are configured to operate the plurality of configurable I/O control register bits.

10. The SAS I/O control system of claim 8, wherein the physical devices comprise data storage devices.

11. The SAS I/O control system of claim 8, wherein the physical devices comprise redundant array of independent disks (RAID) data storage devices.

12. The SAS I/O control system of claim 8, wherein the SAS expander is configured to allow discovery I/O operations to be completed more quickly by setting at least one of the plurality of configurable I/O control register bits to the second value.

13. The SAS I/O control system of claim 8, wherein, for a particular SAS Phy, the SAS expander is configured to set a first particular configurable I/O control register bit associated with a first SAS protocol to the first value and configured to set a second particular configurable I/O control register bit associated with a second SAS protocol to the second value.

14. The SAS I/O control system of claim 8, wherein each SAS Phy has a set of enabled and disabled SAS protocols.

15. A serial attached small computer system interface (SAS) input/output (I/O) control system comprising:
a SAS agent;
a plurality of physical devices;
a SAS expander connecting the plurality of physical devices to the SAS agent and mediating I/O communications between the plurality of physical devices and the SAS agent;
wherein the SAS expander comprises a plurality of SAS Phys, wherein each SAS Phy is associated with a particular physical device of the plurality of physical devices, wherein each SAS Phy is configured to be responsive to a plurality of SAS connection requests, wherein each SAS Phy is associated with at least two configurable I/O control register bits, wherein each of the at least two configurable I/O control register bits is associated with a particular SAS protocol of a plurality of SAS protocols, and wherein the SAS agent is authorized to operate each configurable I/O control register bit;
wherein each SAS Phy is configured to enable opening of a SAS connection or use of a SAS address when a particular configurable I/O control register bit associated with the particular SAS protocol is set to a first value, and wherein each SAS Phy is further configured to reject the SAS connection request when the particular configurable I/O control register bit is set to a second value;
wherein the SAS expander is further configured to operate each configurable I/O control register bit; and
wherein each SAS Phy is configured to return an OPEN REJECT (RETRY) response to a disabled SAS protocol to delay and does not cancel the disabled SAS connection request when the particular configurable I/O control register bit is set to the second value.

16. The SAS I/O control system of claim 15, wherein additional SAS agents are configured to operate the plurality of configurable I/O control register bits.

17. The SAS I/O control system of claim 15, wherein the physical devices comprise data storage devices.

18. The SAS I/O control system of claim 15, wherein the physical devices comprise redundant array of independent disks (RAID) data storage devices.

19. The SAS I/O control system of claim 15, wherein, for a particular SAS Phy, the SAS expander is configured to set a first particular configurable I/O control register bit associated with a first SAS protocol to the first value and configured to set a second particular configurable I/O control register bit associated with a second SAS protocol to the second value.

20. The SAS I/O control system of claim 15, wherein the SAS expander is configured to allow discovery I/O operations to be completed more quickly by setting at least one of the plurality of configurable I/O control register bits to the second value.

* * * * *